US010267569B2

United States Patent
Altman et al.

(10) Patent No.: US 10,267,569 B2
(45) Date of Patent: Apr. 23, 2019

(54) THERMAL STORAGE HEAT EXCHANGER STRUCTURES EMPLOYING PHASE CHANGE MATERIALS

(71) Applicant: Raytheon Company, Waltham, MA (US)

(72) Inventors: David Altman, Sudbury, MA (US); Nicholas Ian Maniscalco, Hunter, NY (US); Jonathan Balducci, Sterline, MA (US); Joshua D. Sole, Rockledge, FL (US); John G. Bustamante, Orlando, FL (US); Christian O. Rodriguez, Melbourne, FL (US)

(73) Assignee: Raytheon Company, Waltham, MA (US)

( * ) Notice: Subject to any disclaimer, the term of this patent is extended or adjusted under 35 U.S.C. 154(b) by 201 days.

(21) Appl. No.: 15/225,624

(22) Filed: Aug. 1, 2016

(65) Prior Publication Data

US 2018/0031332 A1 Feb. 1, 2018

(51) Int. Cl.
*F28D 15/00* (2006.01)
*F28D 20/02* (2006.01)
(Continued)

(52) U.S. Cl.
CPC ............. *F28D 20/02* (2013.01); *F28D 15/00* (2013.01); *F28D 20/021* (2013.01); *F28F 3/02* (2013.01);
(Continued)

(58) Field of Classification Search
CPC ............. F28D 15/00; F28D 2020/0091; F28D 2021/0021; F28D 2021/008; F28D 20/02;
(Continued)

(56) References Cited

U.S. PATENT DOCUMENTS 3,643,733 A * 2/1972 Hall ........................ F28D 7/026
138/32
4,073,514 A * 2/1978 Pate ...................... F16L 37/091
285/149.1
(Continued)

FOREIGN PATENT DOCUMENTS

DE 2551911 A1 6/1977
JP S58164955 A 9/1983
(Continued)

OTHER PUBLICATIONS

International Search Report and Written Opinion of the International Searching Authority for PCT Application No. PCT/US2017/044486 dated Nov. 8, 2017; 13 pages.
(Continued)

*Primary Examiner* — Henry T Crenshaw

(57) ABSTRACT

A heat exchanger includes at least one conduit configured to carry a working fluid. The heat exchanger also includes a plurality of chambers in proximity to the at least one conduit, each chamber configured to contain a phase change material (PCM) that expands upon freezing. The at least one conduit and the plurality of chambers are thermally coupled for transfer of thermal energy between the working fluid and the PCM in each chamber. One wall of each chamber is formed of a compliant layer configured to deform to increase a volume of the chamber as the PCM expands upon freezing.

20 Claims, 4 Drawing Sheets

(51) Int. Cl.
*F28F 23/00* (2006.01)
*F28F 3/02* (2006.01)
*F28F 21/06* (2006.01)
*F28D 21/00* (2006.01)
*F28D 20/00* (2006.01)

(52) U.S. Cl.
CPC .............. *F28F 21/06* (2013.01); *F28F 23/00* (2013.01); *F28D 2020/0091* (2013.01); *F28D 2021/008* (2013.01); *F28D 2021/0021* (2013.01); *F28F 2255/02* (2013.01); *F28F 2265/14* (2013.01)

(58) Field of Classification Search
CPC ..... F28D 20/021; F28F 21/06; F28F 2255/02; F28F 2265/14; F28F 23/00; F28F 3/02
USPC .......................................................... 165/83
See application file for complete search history.

(56) References Cited

U.S. PATENT DOCUMENTS

| | | | |
|---|---|---|---|
| 4,140,173 A | | 2/1979 | Wulf et al. |
| 5,239,839 A | * | 8/1993 | James ................ F25D 3/005 126/400 |
| 5,680,898 A | * | 10/1997 | Rafalovich ........... F24F 5/0017 165/236 |
| 5,944,089 A | | 8/1999 | Roland |
| 6,119,729 A | * | 9/2000 | Oberholzer ............ E03B 7/10 138/27 |
| 6,202,739 B1 | | 3/2001 | Pal et al. |
| 6,343,485 B1 | * | 2/2002 | Duerr .................... B60H 1/005 62/430 |
| 6,988,304 B2 | | 1/2006 | Moseley et al. |
| 7,014,151 B2 | | 3/2006 | Klett et al. |
| 7,859,845 B2 | | 12/2010 | Ullman et al. |
| 7,980,293 B2 | | 7/2011 | Jensen |
| 8,342,454 B1 | | 1/2013 | Leimkuehler et al. |
| 8,935,936 B2 | | 1/2015 | Karl et al. |
| 2009/0188658 A1 | | 7/2009 | Petrenko et al. |
| 2010/0012289 A1 | * | 1/2010 | Haussmann ............ F28D 7/08 165/10 |
| 2011/0030915 A1 | * | 2/2011 | Best ...................... F28D 20/023 165/10 |
| 2011/0132576 A1 | | 6/2011 | Bugby et al. |
| 2014/0008042 A1 | | 1/2014 | Schryver et al. |
| 2014/0284020 A1 | | 9/2014 | Amir et al. |
| 2015/0060017 A1 | | 3/2015 | Chung et al. |
| 2015/0128445 A1 | | 5/2015 | Dittrich et al. |
| 2015/0143818 A1 | | 5/2015 | Eckhoff et al. |
| 2015/0144310 A1 | | 5/2015 | Semmes |
| 2016/0029515 A1 | | 1/2016 | Tansley |
| 2016/0206996 A1 | * | 7/2016 | Van Schaftingen ... B01D 53/90 |

FOREIGN PATENT DOCUMENTS

| | | | |
|---|---|---|---|
| WO | 9516175 A1 | | 6/1995 |
| WO | WO 95/16175 | * | 6/1995 |
| WO | 0192129 A1 | | 12/2001 |
| WO | 2011058383 A2 | | 5/2011 |
| WO | 2012112055 A1 | | 8/2012 |

OTHER PUBLICATIONS

International Search Report and Written Opinion of the International Searching Authority for PCT Application No. PCT/US2017/044500 dated Nov. 10, 2017; 14 pages.

Hansen et al., "Water-Based Phase Change Material Heat Exchanger Development", 44th International Conference on Environmental Systems, Jul. 13-17, 2014, 7 pgs.

Joshua D. Sole, "An Improved Phase Change Thermal Storage Device Using a Vibration Reducing Pre-Compression Elastomer and Method for Fabrication Thereof", U.S. Appl. No. 14/970,914, filed Dec. 16, 2015, 21 pgs.

* cited by examiner

THERMAL STORAGE HEAT EXCHANGER STRUCTURES EMPLOYING PHASE CHANGE MATERIALS

TECHNICAL FIELD

This disclosure is directed in general to thermal storage heat exchangers. More specifically, this disclosure relates to thermal storage heat exchanger structures that employ ice/water as a phase change material.

BACKGROUND

Heat exchangers have a wide variety of applications in systems where thermal energy (often simply referred to as "heat") must be moved from one location to another. Similarly, thermal energy storage (TES) heat exchangers are widely used to temporarily store excess thermal energy and later release the energy. This has the benefit of thermal "load leveling" (duty cycle averaging), reducing the thermal load that must be dissipated. In many TES heat exchangers, a phase change material (PCM), such as paraffin, is used as the thermal storage material in the heat exchanger due to its stability and high thermal storage capacity.

SUMMARY

This disclosure provides a system and method using a thermal storage heat exchanger structure that employs a phase change material (PCM) that expands upon freezing, such as ice/water.

In a first embodiment, a heat exchanger includes at least one conduit configured to carry a working fluid. The heat exchanger also includes one or more chambers in proximity to the at least one conduit, each chamber configured to contain a phase change material (PCM) that expands upon freezing. The at least one conduit and the one or more chambers are thermally coupled for transfer of thermal energy between the working fluid and the PCM in each chamber. One wall of each chamber is formed of a compliant layer configured to deform to increase a volume of the chamber as the PCM expands upon freezing.

In a second embodiment, a system includes at least one heat source, at least one heat sink, and a heat exchanger configured to receive thermal energy from the at least one heat source and provide thermal energy to the at least one heat sink. The heat exchanger includes at least one conduit configured to carry a working fluid. The heat exchanger also includes one or more chambers in proximity to the at least one conduit, each chamber configured to contain a PCM that expands upon freezing. The at least one conduit and the one or more chambers are thermally coupled for transfer of thermal energy between the working fluid and the PCM in each chamber. One wall of each chamber is formed of a compliant layer configured to deform to increase a volume of the chamber as the PCM expands upon freezing.

In a third embodiment, a method includes moving a working fluid through at least one conduit in a heat exchanger. The method also includes transferring thermal energy from a PCM to the working fluid, the PCM disposed in each of one or more chambers proximate to and thermally coupled to the at least one conduit, the PCM configured to expand upon freezing. One wall of each chamber is formed of a compliant layer configured to deform to increase a volume of the chamber as the PCM expands upon freezing.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
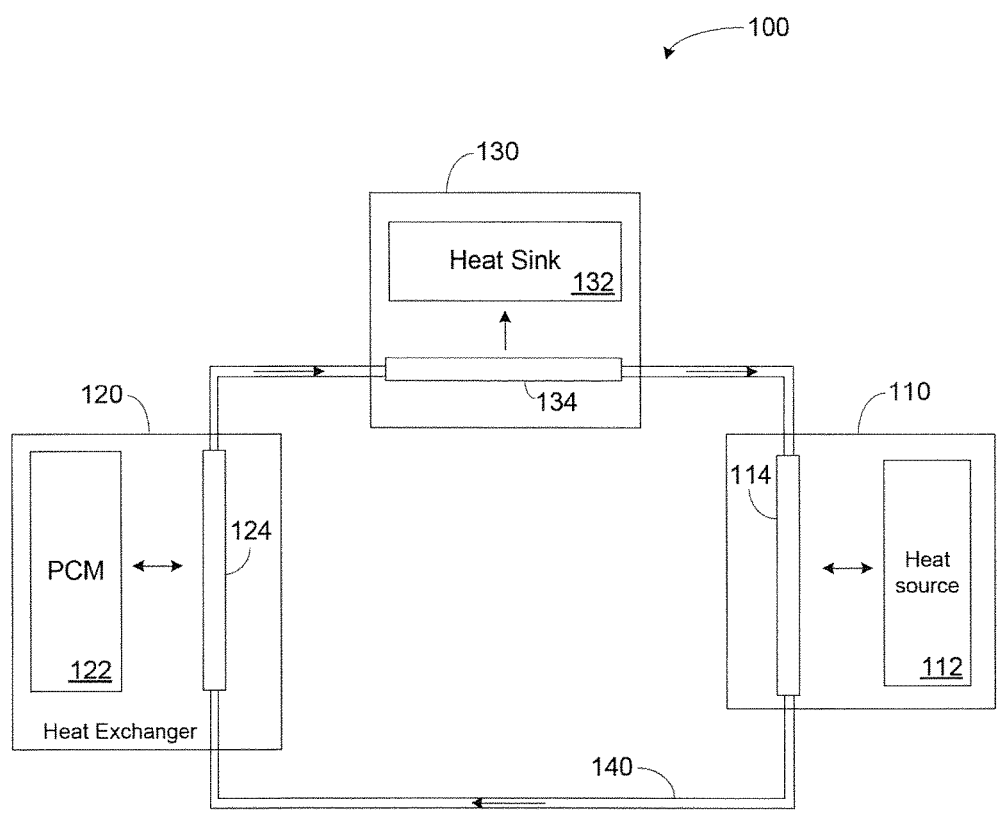
FIG. 1 illustrates an example thermal management system in which a phase change material (PCM) heat exchanger can be used according to this disclosure.

FIGS. 1 through 4, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Existing thermal storage heat exchangers generally use various paraffins as the latent thermal storage material. Paraffin waxes have high enthalpy of fusion (200-280 kJ/kg), are stable, chemically benign, and exhibit repeatable melting and solidification behaviors; however, due to their low thermal conductivity (0.1-0.4 W/mK), a large quantity of heat spreading structure in the PCM heat exchanger is required to enable heat transfer into and out of the PCM. Paraffins also have relatively low densities (700-900 kg/m$^3$) and therefore require a larger volume of material relative to other known organic and inorganic PCMs. In general, high heat rate (>30 kW) paraffin-based PCM heat exchangers are limited to a specific and volumetric energy density of approximately 50-70 kJ/kg and 50-70 MJ/m$^3$, respectively. These numbers are unacceptably low for certain applications in which weight and volume allocations are limited, for example, emerging directed energy applications.

To address the thermal limitations of paraffins, some heat exchanger systems have proposed the use of ice/water as a PCM. The benefits of using ice/water as a PCM arise from its favorable thermo-physical properties. For example, compared to paraffins, ice/water has higher enthalpy of fusion (334 kJ/kg), density (1000 kg/m3), and conductivity (0.6 W/mK (liquid), 2.2 W/mK (solid)). Ice/water is also particularly advantageous for systems that will require refrigeration or have access to very low temperature heat sinking environments. However, ice/water is also unique (relative to most other known PCMs) in that water expands upon freezing. An ice/water PCM heat exchanger must be designed to accommodate this expansion while maintaining effective heat transfer through intimate contact with heat exchanger enveloping and heat spreading structures. Typical plate/fin PCM heat exchanger designs that are effective with common PCMs (such as paraffins) feature rigid enclosures and are not suitable for an ice/water PCM, as the walls of the enclosures would be ruptured by freezing.

Some designs in which ice/water is used as a PCM have shown potential in heat sink (as opposed to heat exchanger)

applications. However, these designs are not suitable for TES PCM heat exchangers where a high heat transfer rate (e.g., hundreds of kilowatts) from/to a liquid working fluid is required, as is the case for many military directed energy applications. This is due to the designed structure, system configuration, and relatively high conductive thermal resistance associated with transferring heat into and out of the ice/water PCM. Similarly, other ice/water PCM heat exchanger structure designs feature high convective and conductive thermal resistances associated with getting heat into and out of the ice/water PCM. While these designs can be suitable in a low rate transfer (tens of kW), relatively small energy (e.g., 5 MJ) applications, such designs are not acceptable in a high rate (e.g., >100 kW), high energy (e.g., ~25 MJ) application, which may be required in directed energy applications.

To address these or other issues, embodiments of this disclosure provide a thermal energy storage (TES) heat exchanger that employs ice/water as a phase change material (PCM) and is not subject to rupture due to the volumetric expansion of ice as it freezes. The disclosed embodiments significantly improve the specific and volumetric energy density of PCM TES heat exchangers, thereby reducing the size and weight of thermal management systems (TMS) that employ load leveling via thermal energy storage.

It will be understood that embodiments of this disclosure may include any one, more than one, or all of the features described here. In addition, embodiments of this disclosure may additionally or alternatively include other features not listed here.

FIG. 1 illustrates an example thermal management system 100 in which a PCM heat exchanger can be used according to this disclosure. The embodiment of the system 100 shown in FIG. 1 is for illustration only. Other embodiments of the system 100 could be used without departing from the scope of this disclosure. Those skilled in the art will recognize that, for simplicity and clarity, some features and components are not explicitly shown in every figure, including those illustrated in connection with other figures. Such features, including those illustrated in other figures, will be understood to be equally applicable to the system 100. It will be understood that all features illustrated in the figures may be employed in any of the embodiments described. Omission of a feature or component from a particular figure is for purposes of simplicity and clarity, and not meant to imply that the feature or component cannot be employed in the embodiments described in connection with that figure.

As shown in FIG. 1, the system 100 includes a heat source component 110, a heat exchanger 120, and a heat sink component 130. The heat source component 110 houses a heat source 112 and a conduit 114. The heat source 112 generates high levels of thermal energy during use, either continually or in short bursts. The heat source 112 may be any of a variety of heat generating sources, including, but not limited to, electronic components, lasers, and the like. Because the heat source 112 can vary greatly, the details of heat source 112 are not illustrated and described. Similarly, the heat source component 110 housing the heat source 112 can vary greatly and can represent any suitable structure in which the heat source 112 is located. In some embodiments, the heat source component 110 may represent a compartment of a land, sea, air, or space vehicle. While FIG. 1 shows one heat source component 110 and one heat source 112 for simplicity, in some embodiments, there can be multiple heat source components 110 and/or multiple heat sources 112.

The conduit 114 carries a working fluid through the heat source component 110 in proximity to the heat source 112. During operation of the system 100, the working fluid passing through the conduit 114 exchanges thermal energy with the heat source 112 through convection and conduction. The working fluid can be any fluid that is suitable for use in a thermal management system. In some embodiments, the working fluid is a mixture of ethylene glycol and water. While a single conduit 114 is shown in FIG. 1, the conduit 114 may actually represent multiple conduits that carry working fluid in parallel, in a mesh pattern, or in any other suitable configuration. In one particular aspect of operation, the heat source 112 generates short bursts of thermal energy and the working fluid in the conduit 114 cools the heat source 112 by absorbing thermal energy that is transferred from the heat source 112 to the conduit 114. In another aspect of operation, the heat source 112 may be in an idle mode or another non-heat-generating mode, and the working fluid in the conduit 114 may transfer thermal energy back to the heat source 112 through the conduit 114.

The heat sink component(s) 130 includes a heat sink 132 and a conduit 134. The heat sink 132 can represent a heat sink for a final transfer of thermal energy out of the system 100. In some embodiments, the heat sink 132 may be the atmosphere, a large body of water, or another suitable heat sink medium, which may be gas, liquid, or a two-phase fluid. Because the heat sink 132 can vary greatly, the details of heat sink 132 are not illustrated and described. Similarly, the heat sink component 130 that includes the heat sink 132 can vary greatly and can represent any suitable location or structure in which the heat sink 132 is located. While FIG. 1 shows one heat sink component 130 and one heat sink 132 for simplicity, in some embodiments, there can be multiple heat sink components 130 and/or multiple heat sinks 132.

The conduit 134 carries a working fluid through the heat sink component 130 in proximity to the heat sink 132. During operation of the system 100, the working fluid passing through the conduit 134 transfers thermal energy to the heat sink 132 through convection and conduction. The working fluid can be any fluid that is suitable for use in a thermal management system. In some embodiments, the working fluid is a mixture of ethylene glycol and water. While a single conduit 134 is shown in FIG. 1, the conduit 134 may actually represent multiple conduits that carry working fluid in parallel, in a mesh pattern, or in any other suitable configuration.

The heat exchanger 120 is a thermal energy storage (TES) phase change material (PCM) heat exchanger that uses a PCM (such as ice/water) as a thermal energy storage material. The heat exchanger 120 includes a PCM chamber 122 and a conduit 124. The heat exchanger 120 is thermally coupled with the heat source component 110 and the heat sink component 130 via a working fluid loop 140 that includes the conduits 114, 124, 134. That is, thermal energy can be transported between the heat source component 110, the heat exchanger 120, and the heat sink component 130 by the working fluid that passes through the loop 140.

The PCM chamber 122 holds the PCM. The conduit 124 carries the working fluid through the heat exchanger 120 in proximity to the PCM chamber 122. During operation of the system 100, the working fluid passing through the conduit 124 exchanges thermal energy with the PCM chamber 122 through convection and conduction. While a single PCM chamber 122 is shown in FIG. 1, most PCM heat exchangers include multiple PCM chambers, and the PCM chamber 122 may represent any suitable number of PCM chambers in the heat exchanger 120. Similarly, the conduit 124 may actually represent multiple conduits that carry working fluid in parallel, in a mesh pattern, or in any other suitable configuration.

In one aspect of operation, thermal energy generated by the heat source 112 is transferred to the working fluid in the conduit 114. The working fluid carries the thermal energy through the loop 140 to the conduit 124 in the heat exchanger 120. In the heat exchanger 120, at least some of the thermal energy is transferred from the working fluid in the conduit 124 to the PCM in the PCM chamber 122 through convection and conduction. The PCM in the heat exchanger 120 is capable of storing the thermal energy until it can be released back to the working fluid in the conduit 124 by transfer of thermal energy in the opposite direction. At such time, thermal energy is transferred from the PCM in the PCM chamber 122 to the working fluid in the conduit 124. The working fluid carries the thermal energy through the loop 140 to the conduit 134 in the heat sink component 130. In the heat sink component 130, at least some of the thermal energy is transferred from the working fluid in the conduit 134 to the heat sink 132.

In accordance with this disclosure, the PCM in the heat exchanger 120 is ice/water. When thermal energy is transferred from the conduit 124 to the PCM chamber 122, the PCM changes from ice to water as the PCM absorbs the thermal energy. Similarly, the PCM changes from water to ice and releases thermal energy when thermal energy is transferred from the PCM chamber 122 back to the conduit 124. The heat exchanger 120 includes a number of advantageous features to accommodate the volumetric expansion of ice as it freezes, as described in greater detail below.

Although FIG. 1 illustrates one example of a thermal management system 100 in which a PCM heat exchanger can be used, various changes may be made to FIG. 1. For example, while the heat source component 110, heat exchanger 120, and heat sink component 130 are shown as separated, this is merely for clarity of illustration. In some embodiments, two or more of the components 110, 120, 130 could be in contact with each other, or two or more of the components 110, 120, 130 could be part of the same structure. Also, the makeup and arrangement of the system 100 are for illustration only. Components could be added, omitted, combined, or placed in any other configuration according to particular needs.

Figure 2:
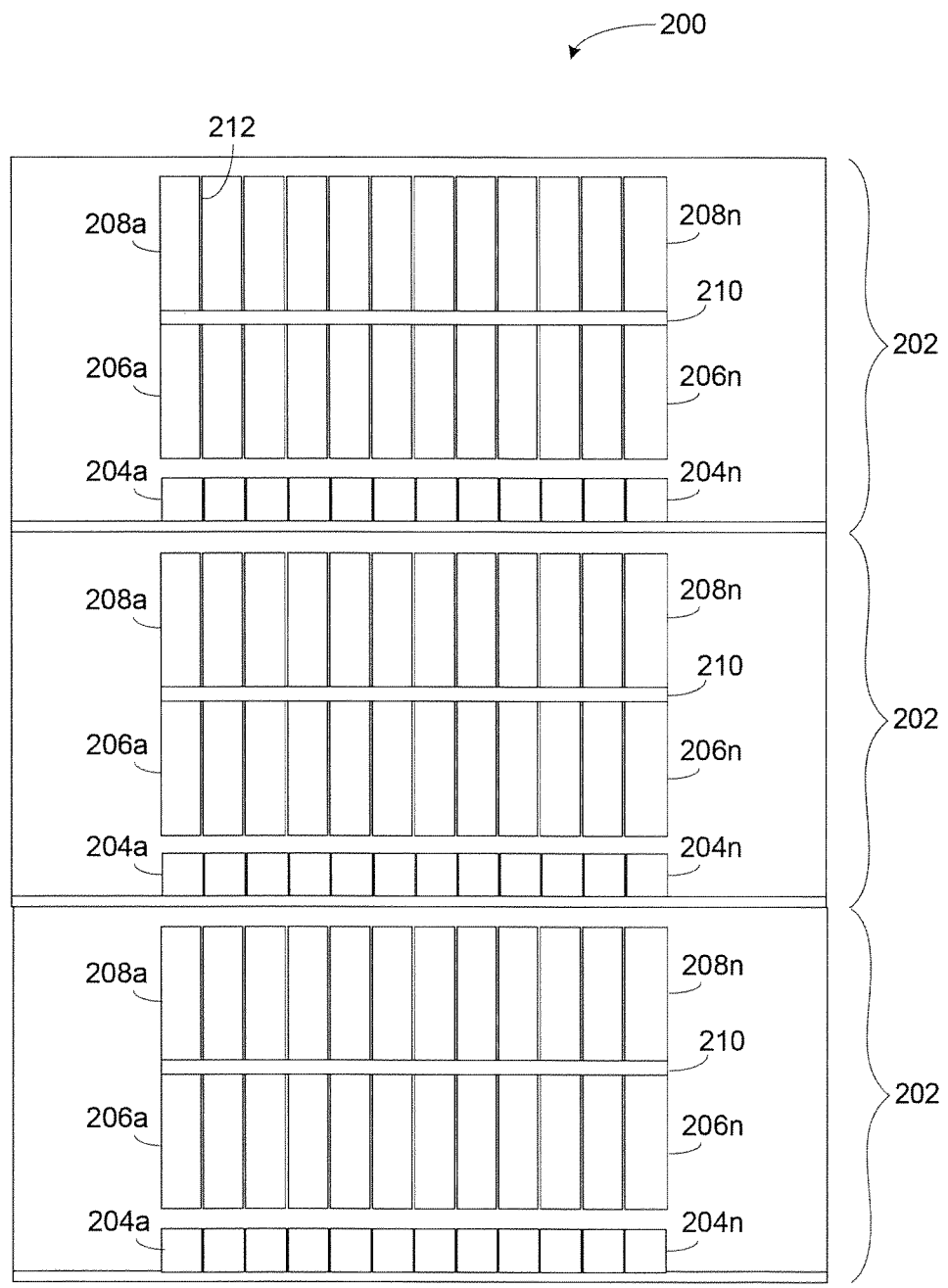
FIG. 2 illustrates a PCM heat exchanger according to this disclosure.

FIG. 2 illustrates a PCM heat exchanger 200 according to this disclosure. The PCM heat exchanger 200 can represent (or be represented by) the heat exchanger 120 of FIG. 1. The embodiment of the PCM heat exchanger 200 shown in FIG. 2 is for illustration only. Other embodiments of the PCM heat exchanger 200 can be used without departing from the scope of this disclosure.

The PCM heat exchanger 200 is a thermal energy storage (TES) heat exchanger and is based on a standard plate/fin heat exchanger architecture; such architectures have been demonstrated to maximize performance to weight ratio (kW dissipated per kg of heat exchanger mass). The PCM heat exchanger includes multiple heat exchanger layers 202. The layers 202 are stackable end to end, side to side, or both, and allow the PCM heat exchanger 200 to be both modular and scalable for increased energy transfer rate and energy storage capacity. Although FIG. 2 illustrates three layers 202 in the PCM heat exchanger 200, in other embodiments, the PCM heat exchanger 200 may include more or fewer than three layers 202.

Each layer 202 includes one or more working fluid conduits 204a-204n, a plurality of PCM chambers 206a-206n and 208a-208n, a compliant layer 210, and a plurality of fins 212.

The working fluid conduits 204a-204n are channels through which a working fluid flows for transfer of thermal energy. The working fluid conduits 204a-204n are arranged adjacent each other and in close proximity to the PCM chambers 206a-206n and 208a-208n. FIG. 2 shows only a cross section of each working fluid conduit 204a-204n. That is, each working fluid conduit 204a-204n is an elongate conduit with at least a portion that is substantially perpendicular to the plane of the page in FIG. 2.

The working fluid conduits 204a-204n are arranged in parallel, and input and output the working fluid, which is part of a thermal management working fluid loop, such as the loop 140 of FIG. 1. The working fluid conduits 204a-204n may represent (or be represented by) the conduit 124 of FIG. 1 and have the same or similar structure and operation. The walls of the working fluid conduits 204a-204n can be a metal, such as aluminum, titanium, copper, stainless steel, or any other suitable material that has advantageous heat transfer properties (e.g., good thermal conductivity). The working fluid can be any fluid that is suitable for use in a thermal management system. In some embodiments, the working fluid is a mixture of ethylene glycol and water.

The PCM chambers 206a-206n and 208a-208n are closed reservoirs that are substantially filled with ice/water, which is the PCM material for the PCM heat exchanger 200. As shown in FIG. 2, the PCM chambers 206a-206n and 208a-208n are arranged in stackable rows, with a first row of PCM chambers 206a-206n separated from a second row of PCM chambers 208a-208n by the compliant layer 210, which forms one wall of each PCM chamber 206a-206n and 208a-208n. The PCM chambers 206a-206n and 208a-208n in each row are adjacent each other, and adjacent chambers may have a common wall. The walls of each PCM chamber 206a-206n and 208a-208n (other than the wall formed by the compliant layer 210) can be a metal, such as aluminum, titanium, copper, stainless steel, or any other suitable material that has advantageous thermal transport properties. Each PCM chamber 206a-206n and 208a-208n is generally elongate, and FIG. 2 shows only a cross section of each PCM chamber 206a-206n and 208a-208n. That is, the longest dimension of each PCM chamber 206a-206n and 208a-208n is substantially perpendicular to the plane of the page in FIG. 2.

The compliant layer 210 is disposed between the two rows of the PCM chambers 206a-206n and 208a-208n and forms one wall of each chamber. The compliant layer 210 is deformable to accommodate volumetric expansion of ice in each PCM chamber 206a-206n and 208a-208n as it freezes during a thermal energy transfer process. The compliant layer 210 then returns to its original configuration (size and shape) as the ice melts into water. The material for the compliant layer 210 should not absorb much (if any) water and should be able to compress without setting. In some embodiments, the compliant layer 210 is a solid elastomeric material such as rubber, foam rubber, latex, or polyurethane. In other embodiments, the compliant layer 210 comprises two metallic foil membranes or layers that are capable of elastic deformation. Such metallic foil membranes are designed to prevent yielding of the membranes, which enables the membranes to return to their original configuration following melting of ice into water.

In one aspect of operation, the PCM material in the PCM chambers 206a-206n and 208a-208n is in a liquid state.

Figure 3:
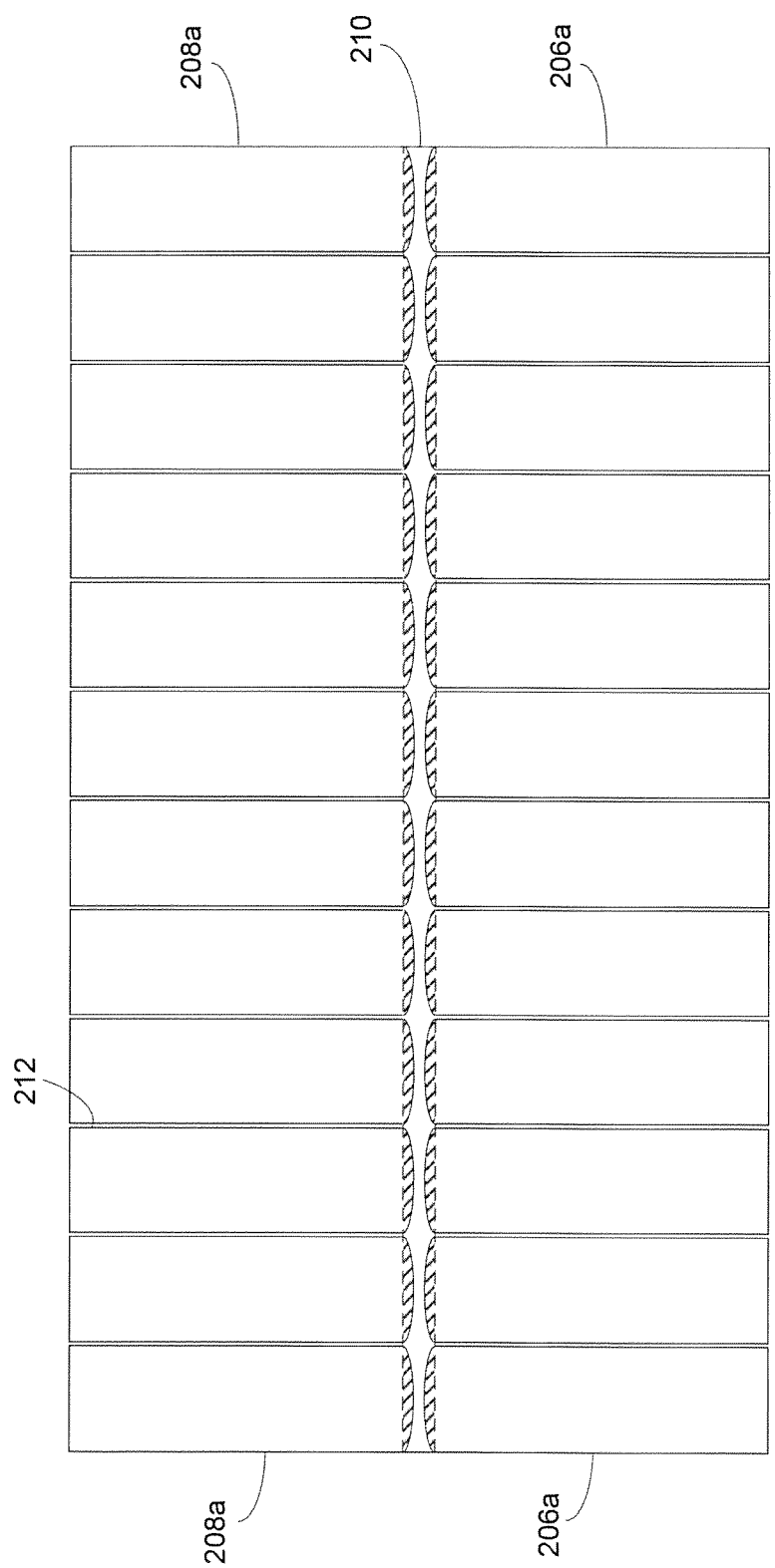
FIG. 3 illustrates the PCM heat exchanger of FIG. 2 in a state where a compliant layer is deformed.

Thermal energy from the PCM chambers 206a-206n and 208a-208n is transferred to the adjacent working fluid conduits 204a-204n through convection and conduction. As the thermal energy leaves the PCM material, the water freezes into ice and expands as it does so. As the ice forms and expands, the compliant layer 210 deforms to provide additional volume inside each PCM chamber 206a-206n and 208a-208n for the expanding ice, thereby avoiding a rupture of any PCM chamber walls. FIG. 3 illustrates a magnified view of the compliant layer 210 when the compliant layer 210 is deformed. As shown in FIG. 3, the compliant layer deforms to expand the overall volume of each PCM chamber 206a-206n and 208a-208n, as indicated by the shaded region in each PCM chamber 206a-206n and 208a-208n. When the compliant layer 210 is a solid elastomeric material, the compliant layer 210 compresses inward. When the compliant layer 210 is two metallic foil layers, each metallic foil layer deforms toward the gap between the layers. Later, when thermal energy is transferred from the working fluid conduits 204a-204n to the PCM chambers 206a-206n and 208a-208n, the ice melts into water and reduces volume, and the compliant layer 210 returns to its static shape.

The fins 212 are thin, planar, metallic walls between adjacent ones of the PCM chambers 206a-206n and 208a-208n, and reduce overall thermal resistance in the heat exchanger 200, which promotes faster heat transfer rates between the PCM and the working fluid. Certain configurations of the fins 212 also promote directional freezing of ice in each of the PCM chambers 206a-206n and 208a-208n by ensuring that the water in a PCM chamber further away from the compliant layer 210 freezes before the water closer to the compliant layer 210. This ensures expansion of ice into the compliant layer 210 and prevents lateral freezing that would potentially deform the fins 212.

Although FIG. 2 illustrates one example of a PCM heat exchanger 200, various changes may be made to FIG. 2. For example, while shown as rectangular, each of the working fluid conduits 204a-204n and the PCM chambers 206a-206n and 208a-208n could be cylindrical or have any other suitable shape. In addition, the makeup and arrangement of the PCM heat exchanger 200 are for illustration only. Components could be added, omitted, combined, or placed in any other configuration according to particular needs. For example, while the working fluid conduits 204a-204n are shown in a parallel, one-to-one configuration with the PCM chambers 206a-206n and 208a-208n, this is merely one example. In other embodiments, the working fluid conduits 204a-204n could be oriented perpendicular to the PCM chambers 206a-206n and 208a-208n or in any other suitable configuration that promotes transfer of thermal energy between the working fluid conduits 204a-204n and the PCM chambers 206a-206n and 208a-208n. Also, other embodiments may include fewer working fluid conduits 204a-204n and more PCM chambers 206a-206n and 208a-208n, or vice versa. In some embodiments, there may be only one PCM chamber or one working fluid conduit.

Figure 4:
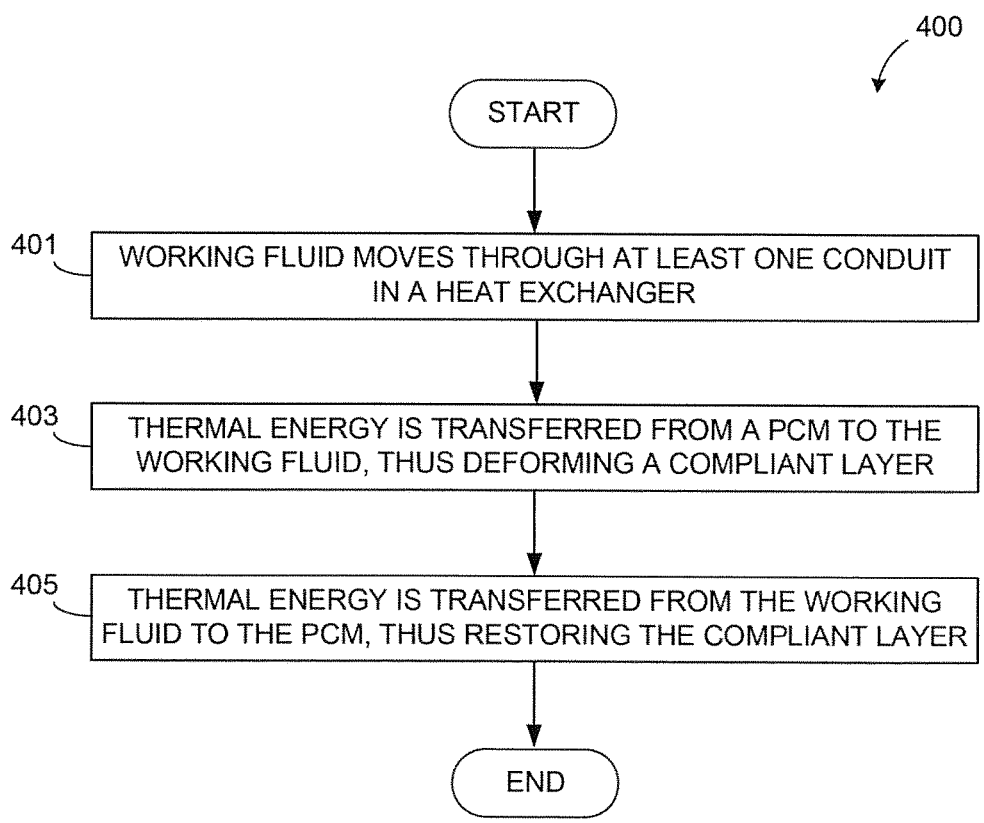
FIG. 4 illustrates an example method for using a PCM heat exchanger according to this disclosure.

FIG. 4 illustrates an example method 400 for using a PCM heat exchanger according to this disclosure. The method 400 may be performed using the PCM heat exchanger 200 of FIG. 2. However, the method 400 could be used with any other suitable system.

At step 401, a working fluid moves through at least one conduit in a heat exchanger. This may include, for example, a working heat transfer fluid moving through one or more conduits 204a-204n.

At step 403, thermal energy is transferred from a PCM to the working fluid. The PCM is disposed in each of a plurality of chambers proximate to and thermally coupled to the at least one conduit. This may include, for example, thermal energy transferring from the PCM in each of the PCM chambers 206a-206n and 208a-208n to the working fluid in each of the conduits 204a-204n. The PCM is a material configured to expand upon freezing, such as ice/water.

One wall of each chamber is formed of a compliant layer configured to deform to increase a volume of the chamber as the PCM expands upon freezing. This may include the compliant layer 210 forming one wall of each of the PCM chambers 206a-206n and 208a-208n. As thermal energy transfers from the PCM to the working fluid, the PCM freezes and expands. As the PCM expands, the compliant layer 210 deforms to increase the volume of the PCM chamber 206a-206n and 208a-208n.

At step 405, thermal energy is transferred from the working fluid to the PCM. This may include, for example, thermal energy transferring from the working fluid in each conduit 204a-204n to the PCM in each PCM chamber 206a-206n and 208a-208n. As thermal energy transfers from the working fluid to the PCM, the PCM melts and contracts. As the PCM contracts, the compliant layer 210 returns to its static condition, thereby decreasing the volume of the PCM chamber 206a-206n and 208a-208n.

Although FIG. 4 illustrates one example of a method 400 for using a PCM heat exchanger, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A heat exchanger comprising:
    a plurality of conduits, each configured to carry a working fluid;
    a plurality of first chambers in proximity to the plurality of conduits, each first chamber corresponding to one of the conduits, each first chamber configured to contain a phase change material (PCM) that expands upon freezing; and
    a plurality of second chambers in proximity to the plurality of first chambers, each second chamber corresponding to one of the first chambers, each second chamber configured to contain the PCM,
    wherein the plurality of conduits and the plurality of first and second chambers are thermally coupled for transfer of thermal energy between the working fluid and the PCM in the chambers, and
    wherein each first chamber and corresponding second chamber have a common wall that is formed of a compliant layer configured to deform to increase a volume of each chamber as the PCM expands upon freezing.

2. The heat exchanger of claim 1, wherein:
    the first chambers are arranged in a first row of adjacent chambers and the second chambers are arranged in a second row of adjacent chambers, and
    the compliant layer is disposed between the first row and the second row.

3. The heat exchanger of claim 1, wherein the compliant layer comprises rubber, foam rubber, latex, or polyurethane.

4. The heat exchanger of claim 1, wherein the PCM comprises ice/water.

5. The heat exchanger of claim 1, wherein the compliant layer comprises a solid layer of elastomeric material.

6. The heat exchanger of claim 1, wherein the compliant layer comprises two or more metallic foil layers spaced apart from each other.

7. The heat exchanger of claim 2, the heat exchanger further comprising:
    a plurality of metallic fins, each fin forming a wall between two of the adjacent chambers, the metallic fins configured to promote the transfer of thermal energy between the working fluid and the PCM.

8. The heat exchanger of claim 7, wherein the conduits, the chambers, the compliant layer, and the metallic fins together form a single heat exchanger layer, the heat exchanger comprising two or more substantially identical heat exchanger layers.

9. A system comprising:
    at least one heat source;
    at least one heat sink; and
    a heat exchanger configured to receive thermal energy from the at least one heat source and provide thermal energy to the at least one heat sink, the heat exchanger comprising:
        a plurality of conduits, each configured to carry a working fluid;
        a plurality of first chambers in proximity to the plurality of conduits, each first chamber corresponding to one of the conduits, each first chamber configured to contain a phase change material (PCM) that expands upon freezing; and
        a plurality of second chambers in proximity to the plurality of first chambers, each second chamber corresponding to one of the first chambers, each second chamber configured to contain the PCM,
        wherein the plurality of conduits and the plurality of first and second chambers are thermally coupled for transfer of thermal energy between the working fluid and the PCM in the chambers, and
        wherein each first chamber and corresponding second chamber have a common wall that is formed of a compliant layer configured to deform to increase a volume of each chamber as the PCM expands upon freezing.

10. The system of claim 9, wherein:
    the first chambers are arranged in a first row of adjacent chambers and the second chambers are arranged in a second row of adjacent chambers, and
    the compliant layer is disposed between the first row and the second row.

11. The system of claim 9, wherein the PCM comprises ice/water.

12. The system of claim 9, wherein the compliant layer comprises a solid layer of elastomeric material.

13. The system of claim 9, wherein the compliant layer comprises two or more metallic foil layers spaced apart from each other.

14. The system of claim 10, the heat exchanger further comprising:
    a plurality of metallic fins, each fin forming a wall between two of the adjacent chambers, the metallic fins configured to promote the transfer of thermal energy between the working fluid and the PCM.

15. The system of claim 14, wherein the conduits, the chambers, the compliant layer, and the metallic fins together form a single heat exchanger layer, the heat exchanger comprising two or more substantially identical heat exchanger layers.

16. The system of claim 9, wherein the system is disposed in a land, sea, air, or space vehicle.

17. A method comprising:
    moving a working fluid through a plurality of conduits in a heat exchanger; and
    transferring thermal energy from a phase change material (PCM) to the working fluid, the PCM disposed in each of a plurality of first chambers proximate to and thermally coupled to the plurality of conduits, the PCM also disposed in each of a plurality of second chambers proximate to and thermally coupled to the plurality of first chambers, each first chamber corresponding to one of the conduits, each second chamber corresponding to one of the first chambers, the PCM configured to expand upon freezing,
    wherein each first chamber and corresponding second chamber have a common wall that is formed of a compliant layer configured to deform to increase a volume of each chamber as the PCM expands upon freezing.

18. The method of claim 17, wherein the compliant layer comprises one of:
    a solid layer of elastomeric material, or
    two or more metallic foil layers spaced apart from each other.

19. The method of claim 17, wherein the compliant layer comprises rubber, foam rubber, latex, or polyurethane.

20. The method of claim 17, wherein the PCM comprises ice/water.

* * * * *